Figure 1:
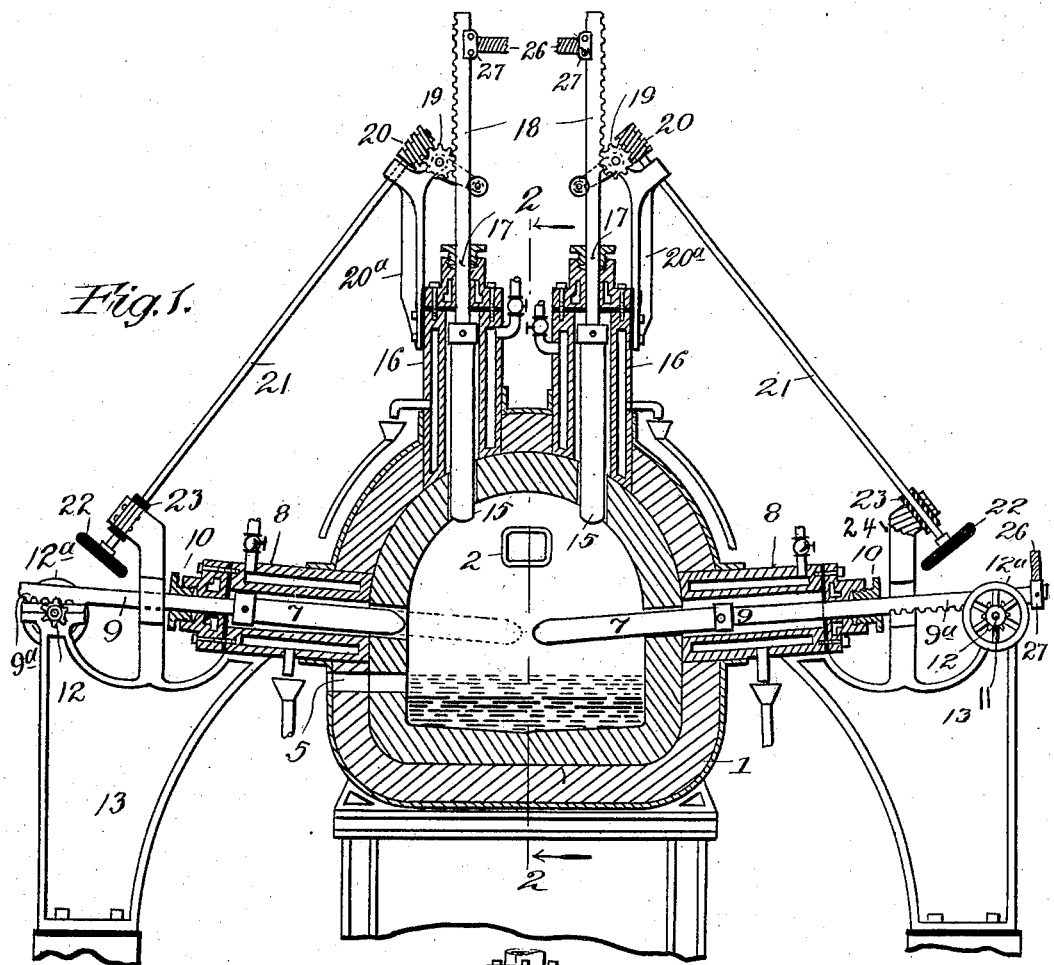

J. W. EVANS.
METHOD OF REDUCING REFRACTORY MATERIAL.
APPLICATION FILED JULY 15, 1909.

960,863.  Patented June 7, 1910.

Witnesses:

Inventor
J. W. Evans.
By his Attorney
T. F. Bourne

UNITED STATES PATENT OFFICE.

JOHN W. EVANS, OF BELLEVILLE, ONTARIO, CANADA.

METHOD OF REDUCING REFRACTORY MATERIAL.

960,863.

Specification of Letters Patent. Patented June 7, 1910.

Application filed July 15, 1909. Serial No. 507,681.

*To all whom it may concern:*

Be it known that I, JOHN W. EVANS, a subject of the King of England, and resident of Belleville, in the Province of Ontario and Dominion of Canada, have invented certain new and useful Improvements in Methods of Reducing Refractory Material, of which the following is a specification.

The object of my invention is to reduce refractory material of various kinds.

My invention particularly is adapted to the production of steel, malleable iron, or pig iron direct from iron ore, and particularly from ore containing titanium, or titanium and vanadium, whereby a hard, tough steel may be produced without requiring the production of pig iron from which steel is to be made, and without requiring the use of the air blast in the production of the steel.

By means of my improvements steel may be produced direct from iron without saturating the ore or metal with carbon as I am enabled to use a relatively small quantity of carbon to produce the desired results, thereby reducing the cost incident to the use of an excess of carbon in the production of steel.

In carrying out my invention for the production of steel I subject iron ore that is mixed with the proper amount of reducing agents and fluxing material to the action of an electric arc to form slag on the surface of the ore, then cut off said arc and next heat such molten mass by passing electric current through a portion of the same, whereby the molten metal will sink to the bottom of the furnace and the slag and metal may be drawn off separately.

In producing steel direct from iron ore in accordance with my invention 10% by weight of suitable carbonaceous material, such as charcoal and tar, may be mixed with 90% by weight of iron ore and fluxing material, which mixture is then placed in a furnace and subjected to the reflected heat from an electric arc, and next to the current flowing through a portion of the molten mass by causing electrodes to enter the same. Any further carbon required may be supplied to the mass by regulating the length of time that the electrodes engage the molten mass, whereby some of the carbon of the electrodes may be taken up in the mass; or further carbon may be added to the mass as required. Said proportions of ingredients may be varied in accordance with the character of steel desired and the quality of the ore treated.

To produce malleable iron in accordance with my invention a smaller quantity of carbon will be required, mixed with the ore and fluxing material, than for making steel, and such carbon as enters the mass from the electrodes in contact therewith will also supply a proportion of the carbon required.

Where pig iron is to be produced according to my invention the carbonaceous matter will be supplied to the ore in approximately the required amount irrespective of such carbon as may become mixed with the molten mass from the heated electrodes that enter the same.

Figure 2:
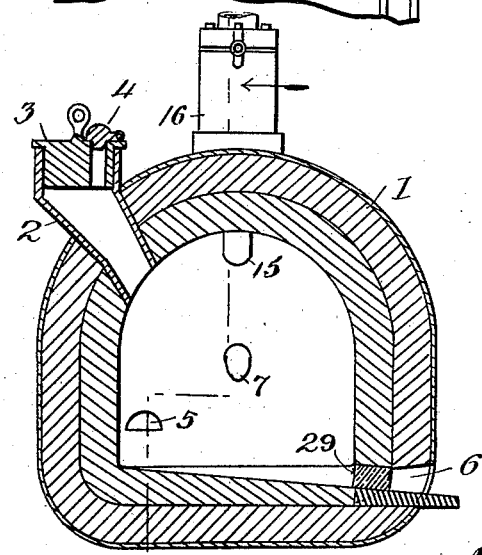

In the accompanying drawings I have illustrated an apparatus adapted to carry out my invention, wherein, Figure 1 is a vertical section of a furnace adapted for the production of steel, malleable iron, or pig iron, and Fig. 2 is a cross section thereof on the line 2, 2 in Fig. 1.

Similar numerals of reference indicate corresponding parts in the several views.

In the drawings the numeral 1 indicates a furnace which may be of any suitable construction and is preferably provided with an arched inner chamber into which the ores or other material to be treated may be passed through a suitable hopper 2 shown provided with a plug or stopper 3 having a suitable vent 4 for gases, the outlet for slag being shown at 5 and the outlet for metal at 6. Said chamber is practically air tight to exclude the atmosphere during operation.

At 7 are substantially horizontally disposed electrodes shown passing through suitable openings in the side walls of the furnace and provided with suitable water jackets 8, with suitable insulation. Any suitable means may be provided for supporting and operating said electrodes. I have shown said electrodes connected with rods 9 passing through stuffing boxes 10 and having racks 9ª engaged by pinions 11 carried by shafts 12 supported by brackets 13, whereby the electrodes may be operated. Said electrodes are located in such position as to produce the electric arc above the level of the ore or other material in the furnace, so as to heat the same by the reflected heat from the arc.

At 15 are substantially vertically disposed electrodes passing downwardly through the top of the furnace and at a suitable distance apart, whereby when said electrodes are pushed downwardly into the material in the chamber, and the electric current is passed through the same, such material will be melted in the well known manner. The electrodes 15 are shown located substantially in vertical alinement with the path or plane of the electrodes 7 in such position that an arc may be formed between the adjacent electrodes 7 and 15 at the sides of the furnace as desired when a pair of electrodes 7 and 15 are adjusted in proper position. The electrodes 15 being located on opposite sides of the vertical center of the furnace and preferably somewhat near the side walls of the furnace enable heat from arcs formed between the corresponding electrodes 7 and 15 to be applied over the material to be melted at the sides of the central portion of such material. By placing the electrodes 15 at one side of the path or plane of electrodes 7 the arc may be formed between the latter electrodes, while at the same time the electrodes 15 enter the material to heat the latter by the passage of current therethrough.

The electrodes 15 are shown protected by water jackets 16 and suitable insulation, said electrodes being shown connected with rods 17 provided with racks 18 engaged by pinions 19 for operating the electrodes. For convenience in operating the electrodes 15 I have shown worms 20 meshing with pinions 19 and carried by shafts 21 inclining downwardly and provided with operating wheels 22 located adjacent wheels 12ª of shafts 12, so that the operator may readily operate said wheels as required, shafts 21 being provided with insulation 23 at the bearings on supports 24, brackets 20ª being insulated from the casing. Conductors 26 will be connected with the respective electrodes in any suitable manner, as by clips 27, and suitable switches will be arranged in the circuits so that current may be directed through the electrodes 7 for the horizontal reflected arc, or through electrodes 15 for passage through the material to be melted, or through the pairs of electrodes 7, 15 at opposite sides of the furnace as required. The metal outlet 6 in the furnace may be closed in usual manner by a plug 29.

The metal to be treated, such as iron ore, mixed with any suitable flux and reducing agents, such as limestone, charcoal and tar, or other form of carbon, will be filled into the furnace to a suitable level, as above the slag outlet 5. Electrodes 15 will be raised and current caused to flow through electrodes 7 to produce a substantially horizontal arc over the material, and by the form of the furnace shown the arc will be caused to melt the material at the upper portion producing slag thereon. When the metal is sufficiently melted by the reflected heat from the arc the electrodes 7 are withdrawn, (as indicated at the left in Fig. 1,) and then the electrodes 15 will be lowered into the slag as far as desired, and the current then passed through electrodes 15 and the slag, whereby the material will be melted and the slag drawn off as required. In case the material at one or both sides of the furnace cools off or is not sufficiently melted the electrodes 7 and 15 at such side or sides of the furnace will be adjusted in such position as to produce an arc between them, and such arc will serve to further melt such metal at the corresponding side of the furnace, it being understood that the arc between electrodes 7 and 15 at either or both sides of the furnace may be used as required. It will thus be understood that at any time during the operation the electrodes 7 or the electrodes 15 can be brought into operation as desired, by merely substituting one set in operating position for the other, and passing the current through the same, or the pairs of electrodes 7 and 15 may be brought into use as required.

By means of my invention steel may be made direct from iron ore, in which case the ore will be mixed with the proper amount of flux and carbonaceous material so proportioned that only enough is allowed for the reduction of the ore. The arc is first used, and then when a suitable amount of slag is formed the electrodes 7 are withdrawn or the current cut off, the electrodes 15 are lowered into the slag thereby reducing the amount of electric energy required, and toward the end of the operation, as when the material has been reduced to the desired extent, the electrodes 15 are or may be withdrawn from the material and the horizontal electrodes again used to produce the arc to refine the metal and keep the percentage of carbon to the amount required. Furthermore, my furnace is particularly adapted to treating ore containing titanium and vanadium, and by suitably regulating the quantity of limestone, sulfur and titanium can be slagged off and fine steel can be obtained, or if a hard tool steel is desired when treating titaniferous iron ores less limestone may be used, and by regulating the quantity thereof any desired proportion of titanium can be retained in the steel. Malleable iron may be produced from iron ore by mixing with the ore the required quantity of carbon and fluxing material, which will be less than for making steel from such ore, and where pig iron is to be produced the carbonaceous matter will be supplied to the required amount. In either case note will be taken of any carbon that would enter the mass from the vertical electrodes 15 when in contact therewith. Other ores or materials may be reduced by means of my invention by the use of the arc from the horizontal electrodes 7 and the heat from the electric current passed through the molten material through the vertical electrodes 15 that enter the melted mass. My invention is, therefore, applicable to the reduction of highly refractory materials of various kinds by reason of the facility with which the top portion of the material may be melted by the arc, and the operation continued by the current passing through said melted material from the vertical electrodes, and by the further facility with which the material at the sides of the furnace may be heated when required by either pair of electrodes 7 and 15 or by both pairs.

My invention is also applicable to the treatment of ores high in sulfur from which mild steel low in sulfur may be obtained. By adding desired quantities of titaniferous iron ores or small amounts of titanium or titanium alloys large percentages of sulfur may be eliminated from sulfurous iron ores and a high grade tool steel obtained, the amount of titanium retained in the steel being varied by the amount of limestone or suitable fluxes which are used in the charge.

I do not in this application claim the mechanism herein set forth, as that is embraced within a separate application for patent filed by me on July 15, 1909. Serial No. 507,680.

Having now described my invention what I claim is:

1. The method of reducing refractory material consisting in first applying heat to a body of material by an arc without the material to produce a molten mass, then cutting off such arc, and next heating said molten mass by passing electric current through a portion of the same.

2. The method of reducing refractory material consisting in subjecting the same to the action of an arc at an approximately central portion of the body of material, subjecting said material to an arc at a distance from said central portion, and subjecting said heated mass to electric current passing through a portion of the same.

3. The method of reducing ore consisting in first subjecting a suitable ore mixture to the action of an arc to produce slag on the mass, then cutting off said arc, and next heating said mass by passing electric current through a portion of the same.

4. The method of reducing ore consisting in subjecting a suitable ore mixture to the action of an arc at an approximately central portion of said mixture to produce slag on the mass, subjecting said mass to an arc at a distance from said central portion, and subjecting said molten mass to electric current passing through the same.

5. The method of producing steel direct from iron ore consisting in first subjecting a mixture of iron ore, carbon and flux to the action of an arc to produce slag on the mass, then cutting off said arc, and next heating said molten mass by passing electric current through a portion of the same.

6. The method of producing steel direct from iron ore consisting in first subjecting a mixture of iron ore, carbon and flux to the action of the reflected heat from an arc at approximately the central portion of said mixture to produce a molten mass, subjecting said molten mass to an arc at a distance from said central portion, and subjecting said molten mass to electric current passing through the same.

7. The method of reducing refractory material consisting in first applying heat to a body of material by an arc to produce a molten mass, then cutting off such arc, and next heating said molten mass by passing electric current through a portion of the same, then cutting off said current and next refining said molten mass by applying heat to the same from an electric arc.

Signed at New York city, in the county of New York, and State of New York, this 2nd day of July, A. D. 1909.

JOHN W. EVANS.

Witnesses:
HARCOURT BULL,
T. F. BOURNE.